C. A. SWITZER.
VEHICLE SIGNAL.
APPLICATION FILED AUG. 25, 1913.
1,128,547.
Patented Feb. 16, 1915.
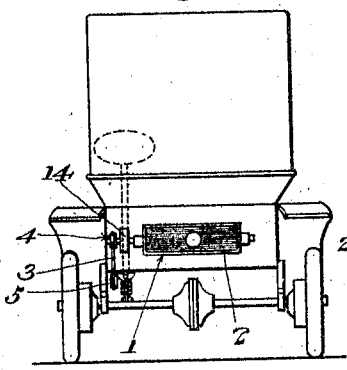
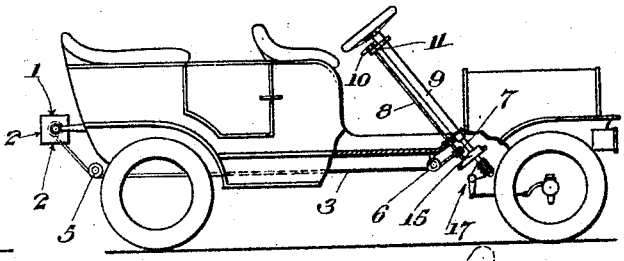
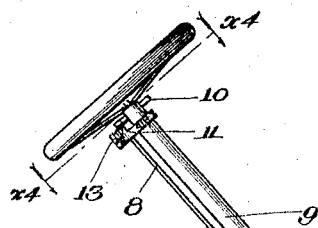
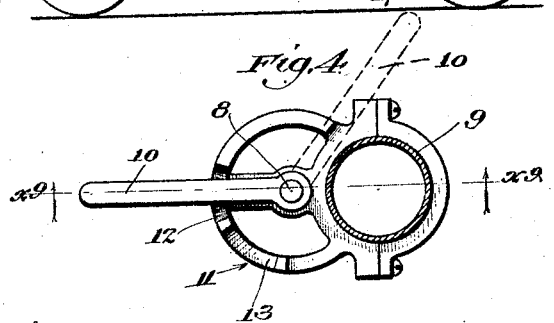
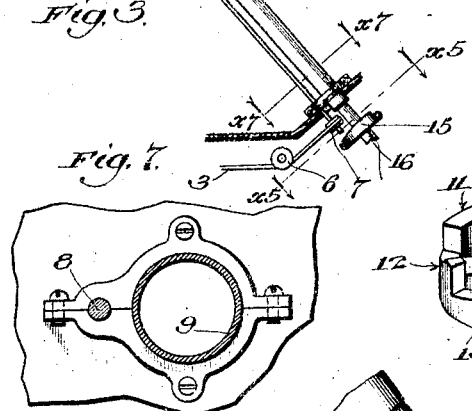
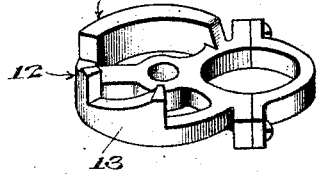
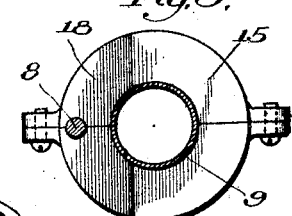
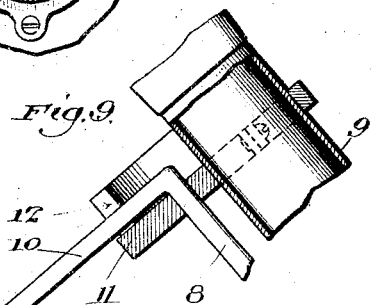
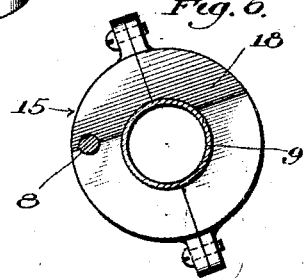
Witnesses:
Inventor:
Charles A. Switzer,
by Lyon & Hackley, attys.

UNITED STATES PATENT OFFICE.

CHARLES A. SWITZER, OF PASADENA, CALIFORNIA.

VEHICLE-SIGNAL.

1,128,547.  Specification of Letters Patent.  Patented Feb. 16, 1915.

Application filed August 25, 1913. Serial No. 786,426.

*To all whom it may concern:*

Be it known that I, CHARLES A. SWITZER, a citizen of the United States, residing at Pasadena, in the county of Los Angeles and State of California, have invented a new and useful Vehicle-Signal, of which the following is a specification.

This invention relates to a vehicle signal adapted for use on motor vehicles for indicating the direction the vehicle is about to take, or to indicate whether the vehicle is about to come to a stop, the signal being operable by the driver, and the main object of the invention is to cause the said signal, after having been set in either of its positions indicating a turn to the left or right, to be automatically restored to normal position by the action of the vehicle in making the turn. Where signals of this character have to be normally restored, the driver often neglects to restore them, and the signal thus continues to falsely indicate the intention of the driver, all of which is obviated by the present invention.

In a previous application of mine filed April 17th, 1913, Serial No. 759,534, I have shown a signal of this character which is automatically restored after a certain time interval, but such restoration is not accomplished by the turning action of the steering mechanism, as in the present case.

Referring to the drawings: Figure 1 is a rear elevation of an automobile equipped with the device. Fig. 2 is a side elevation of an automobile equipped with the device, part of the automobile being broken away. Fig. 3 is an enlarged side elevation of the steering post and adjacent mechanism. Fig. 4 is an enlarged section on line $x^4$—$x^4$, Fig. 3. Fig. 5 is an enlarged section on line $x^5$—$x^5$, Fig. 3. Fig. 6 is a view similar to Fig. 5, showing the cam turned in a different position. Fig. 7 is a section on line $x^7$—$x^7$, Fig. 3. Fig. 8 is a perspective in detail of the sector. Fig. 9 is a section on line $x^9$—$x^9$, Fig. 4.

The signal comprises a rotatable element 1, which is provided with a plurality of indicating faces 2, which may be provided with their respective indicating signs indicating "left" and "right." The indicating member is preferably hollow with transparent sides, and provided with an electric light inside to illuminate it in the dark.

The signal member is mounted to rotate to bring any of its signs into view, this rotation being accomplished by means of a cable 3 which is connected to a sheave 4 secured to the signaling member 1. The cable 3 extends over idle sheaves 5 and 6 and is attached to a sheave 7 fixed on the lower end of a controlling rod 8 which extends up alongside the steering column 9, and a handle 10 is provided for operating the control rod 8. The rod 8 is capable of rotation and longitudinal movement, and by operating the handle 10 the rod 8 may be turned to turn the signal member 1 into a corresponding position. In order to hold the parts in proper indicating position when set in indicating position, I provide a sector 11 which is provided with notches 12 and 13 which are adapted to receive the handle 10. Thus by turning the handle 10 into register with notch 12, it will turn the signal to indicate, for example, "right;" and by then pushing the handle 10 down into notch 12, it will hold the parts and the signal in this position until they are restored, as will be described. By moving the handle 10 into register with notch 13 and then pushing it down into engagement therewith, the signal will be turned and locked in the position indicating "left" until restored.

A coil spring 14 is arranged on the signal member 1 to turn the latter to normal position when the handle 10 is released from either of the notches in the sector 11, and in order to release the signal, I provide a cam 15 which is rigidly secured on the steering post 16. The steering post 16 when turned, acts to steer the front wheels. This may be accomplished in any desired manner, as for example, by the worm gearing 17 indicated in Fig. 2. The cam 15 is so arranged that when the steering mechanism is in central position with the wheels turned to guide the vehicle straight ahead, a recessed portion 18 of the cam 15 will be under the end of the control rod 8, thereby permitting the control rod 8 to be moved down longitudinally when engaging the handle 10 with either of the notches in the sector. The signal will thus stand in indicating position so long as the wheels of the automobile are in this straight position. As soon, however, as the driver turns the wheels to guide the vehicle around the corner, the cam 15 will operate to push up the rod 8 and release the handle 10 from the notch in the sector, whereupon the spring 14 will turn the signal member 1 back to normal position. This action will occur when the steering wheels are turned in either direction, either left or right, sufficiently to guide the vehicle around the corner.

What I claim is:

1. In a vehicle in combination with the steering mechanism thereof, a signal on the vehicle for indicating the direction in which the vehicle is about to travel, a control rod mounted to slide longitudinally and rotate, extending along the steering column, means for detachably locking said control rod in different angular positions, and means controlled by said steering mechanism for moving said control rod longitudinally for unlocking said control rod when the steering mechanism is operated to turn the vehicle.

2. In a vehicle in combination with the steering mechanism thereof, a signal on the vehicle adapted to indicate the direction in which the vehicle is about to travel, a control rod extending along the steering post, said control rod being slidable and revoluble, a handle on said control rod, a sector having a plurality of notches adapted to engage said handle, and a cam on said steering post adapted to operate said control rod longitudinally when said steering post is turned to steer the vehicle to the right or left.

3. In a vehicle in combination with the steering mechanism thereof, a signal on the vehicle adapted to indicate the direction in which the vehicle is about to travel, a control rod extending along the steering post, said control rod being slidable and revoluble, a handle on said control rod, a sector having a plurality of notches adapted to engage said handle, a cam on said steering post adapted to operate said control rod longitudinally when said steering post is turned to steer the vehicle to the right or left, and spring means for restoring said signal to normal position when said handle is released from the sector.

In testimony whereof, I have hereunto set my hand at Los Angeles, California this 4th day of August 1913.

CHARLES A. SWITZER.

In presence of—
 GEO. T. HACKLEY,
 LAURINE GRIFFITH.

Copies of this patent may be obtained for five cents each, by addressing the "Commissioner of Patents, Washington, D. C."